US010822517B2

(12) United States Patent
Shieh et al.

(10) Patent No.: US 10,822,517 B2
(45) Date of Patent: Nov. 3, 2020

(54) RESIN COMPOSITION AND CURED RESIN COMPOSITION

(71) Applicant: INDUSTRIAL TECHNOLOGY RESEARCH INSTITUTE, Hsinchu (TW)

(72) Inventors: Tien-Shou Shieh, Hsinchu (TW); Pei-Hsin Chien, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 136 days.

(21) Appl. No.: 16/297,265

(22) Filed: Mar. 8, 2019

(65) Prior Publication Data

US 2020/0165481 A1    May 28, 2020

Related U.S. Application Data

(60) Provisional application No. 62/772,384, filed on Nov. 28, 2018.

(30) Foreign Application Priority Data

Feb. 11, 2019 (TW) .............................. 108104378 A

(51) Int. Cl.
*C09D 163/00* (2006.01)
*C08G 59/24* (2006.01)
*C09D 7/47* (2018.01)
*C08G 59/18* (2006.01)

(52) U.S. Cl.
CPC .......... *C09D 163/00* (2013.01); *C08G 59/186* (2013.01); *C08G 59/245* (2013.01); *C09D 7/47* (2018.01); *C08G 2150/00* (2013.01)

(58) Field of Classification Search
CPC ....................... C08G 2150/00; C09D 163/00
See application file for complete search history.

(56) References Cited

U.S. PATENT DOCUMENTS

| | | | |
|---|---|---|---|
| 4,212,960 A | 7/1980 | Hayashi et al. | |
| 5,030,698 A | 7/1991 | Mülhaupt et al. | |
| 5,098,956 A | 3/1992 | Blasko et al. | |
| 5,194,502 A | 3/1993 | Saito et al. | |
| 6,015,865 A | 1/2000 | Blank et al. | |
| 6,998,011 B2 | 2/2006 | Schoenfeld et al. | |
| 7,087,702 B2 | 8/2006 | Ogura et al. | |
| 7,910,656 B2 | 3/2011 | Lutz et al. | |
| 8,673,108 B2 | 3/2014 | Liang et al. | |
| 9,796,809 B2 | 10/2017 | Frick et al. | |
| 2002/0111420 A1 | 8/2002 | Papathomas | |
| 2005/0022929 A1 | 2/2005 | Schoenfeld et al. | |
| 2011/0046266 A1* | 2/2011 | Hefner, Jr. ............. | C08L 63/00 523/400 |
| 2014/0128503 A1* | 5/2014 | Karl ..................... | C07D 303/28 523/400 |
| 2014/0349109 A1* | 11/2014 | Li .......................... | B32B 37/26 428/355 EP |
| 2017/0197356 A1* | 7/2017 | Xie ....................... | C08G 59/42 |
| 2017/0233521 A1 | 8/2017 | Morley et al. | |
| 2019/0077073 A1* | 3/2019 | Kwisnek ................ | C08L 91/00 |

FOREIGN PATENT DOCUMENTS

| | | |
|---|---|---|
| CN | 1511341 A | 7/2004 |
| CN | 1331911 C | 8/2007 |
| CN | 1930206 B | 5/2011 |
| CN | 102863936 A | 1/2013 |
| CN | 101868489 B | 6/2013 |
| CN | 101517029 B | 10/2013 |
| CN | 103865238 B | 12/2015 |
| CN | 103865235 B | 1/2016 |
| CN | 103865237 B | 3/2016 |
| CN | 103937166 B | 3/2016 |
| CN | 103937167 B | 3/2016 |
| CN | 103909257 B | 4/2016 |
| CN | 103881532 B | 8/2016 |
| CN | 107641193 A | 1/2018 |
| EP | 0 449 776 A2 | 10/1991 |
| JP | 52-84248 A | 7/1977 |
| JP | 58-17534 B2 | 4/1983 |
| JP | 2004-156024 A | 6/2004 |
| JP | 2005-159228 A | 6/2005 |
| JP | 2005-343990 A | 12/2005 |
| JP | 2006-63227 A | 3/2006 |
| JP | 2006-199863 A | 8/2006 |
| JP | 2007-23134 A | 2/2007 |
| JP | 2007-308601 A | 11/2007 |
| JP | 2008-1758 A | 1/2008 |
| JP | 2010-285627 A | 12/2010 |
| JP | 4632077 B2 | 2/2011 |
| JP | 4636593 B2 | 2/2011 |
| JP | 4650663 B2 | 3/2011 |
| JP | 4815877 B2 | 11/2011 |
| JP | 4864327 B2 | 2/2012 |
| JP | 5569215 B2 | 8/2014 |
| JP | 2017-171902 A | 9/2017 |
| TW | 201339237 A | 10/2013 |

OTHER PUBLICATIONS

Taiwanese Office Action and Search Report, dated Mar. 10, 2020, for Taiwanese Application No. 108104378.

\* cited by examiner

*Primary Examiner* — Megan McCulley
(74) *Attorney, Agent, or Firm* — Birch, Stewart, Kolasch & Birch, LLP.

(57) ABSTRACT

A resin composition is provided, which includes an oligomer formed by reacting bisphenol epoxy resin monomer, aliphatic diglycidyl ether, anhydride compound, and catalyst, wherein the molar ratio of epoxy groups of the bisphenol epoxy resin monomer and aliphatic diglycidyl ether to anhydride groups of the anhydride compound is between 3.5:1 and 8.8:1. The bisphenol epoxy resin monomer and aliphatic diglycidyl ether have a molar ratio of 0.3:1 to 1.3:1, and the viscosity of the resin composition is 20 Pa·s to 80 Pa·s at 25° C.

19 Claims, No Drawings

RESIN COMPOSITION AND CURED RESIN COMPOSITION

CROSS REFERENCE TO RELATED APPLICATIONS

The application is based on, and claims priority from, Taiwan Application Serial Number 108104378, filed on Feb. 11, 2019, and U.S. Provisional Application No. 62/772,384, filed on Nov. 28, 2018, the disclosure of which are hereby incorporated by reference herein in its entirety.

TECHNICAL FIELD

The technical field relates to resin composition, and in particular it relates to the molar ratio of the epoxy groups of the bisphenol epoxy resin monomer and aliphatic diglycidyl ether to the anhydride groups of the anhydride compound.

BACKGROUND

Epoxy resins are widely applied in electronic applications such as electrical insulation, laminate, package for electronic semiconductors, and the like due to their excellent electrical properties, adhesion, and climate resistance. However, high UV energy is needed to cure the epoxy resins, and the shortcomings of a slow photo-curing rate cannot be prevented. In addition, a bisphenol epoxy resin with a high viscosity should be diluted with a reactive diluent (such as aliphatic diglycidyl ether). Although viscosity is lowered, the curing rate of the composition becomes slower also. The hydrogenated bisphenol epoxy resin can quickly be photo cured, but a thick film coated from the composition of the hydrogenated bisphenol epoxy resin may easily be cured on the surface without being cured in the internal part of the thick film.

Accordingly, a novel epoxy resin composition is called for.

SUMMARY

One embodiment of the disclosure provides a resin composition, including: an oligomer formed by reacting bisphenol epoxy resin monomer, aliphatic diglycidyl ether, anhydride compound, and catalyst, wherein the molar ratio of epoxy groups of the bisphenol epoxy resin monomer and aliphatic diglycidyl ether to anhydride groups of the anhydride compound is between 3.5:1 and 8.8:1, wherein the bisphenol epoxy resin monomer and aliphatic diglycidyl ether have a molar ratio of 0.3:1 to 1.3:1, and wherein the viscosity of the resin composition is 20 Pa·s to 80 Pa·s at 25° C.

In some embodiments, the resin composition includes the unreacted bisphenol epoxy resin monomer and aliphatic diglycidyl ether.

In some embodiments, the bisphenol epoxy resin monomer includes bisphenol A epoxy resin monomer, hydrogenated bisphenol A epoxy resin monomer, bisphenol F epoxy resin monomer, hydrogenated bisphenol F epoxy resin monomer, or a combination thereof.

In some embodiments, the aliphatic diglycidyl ether includes ethylene glycol diglycidyl ether, dipropylene glycol diglycidyl ether, 1,4-butylene glycol diglycidyl ether, neopentylene glycol diglycidyl ether, 1,6-hexanediol diglycidyl ether, 1,4-cyclohexanedimethanol diglycidyl ether, polypropylene glycol diglycidyl ether, or a combination thereof.

In some embodiments, the anhydride compound includes 4-methylhexahydrophthalic anhydride, hexahydrophthalic anhydride, Nadic methyl anhydride, 1,2,4-trimellitic anhydride, dodecenyl succinic anhydride, phthalic anhydride, tetrahydrophthalic anhydride, methyl tetrahydrophthalic anhydride, or a combination thereof.

In some embodiments, the catalyst includes triethnolamine, dimethylbenzylamine, triphenylphosphine, or a combination thereof.

In some embodiments, the resin composition further includes a curing agent.

In some embodiments, the curing agent comprises a cationic initiator or an anionic initiator.

In some embodiments, the resin composition further includes an acrylate oligomer and a radical initiator.

In some embodiments, the resin composition further includes a filler, a defoamer, a leveling agent, or a combination thereof.

One embodiment of the disclosure provides a cured resin composition, wherein the resin composition includes: an oligomer formed by reacting bisphenol epoxy resin monomer, aliphatic diglycidyl ether, anhydride compound, and catalyst, and a curing agent; wherein the molar ratio of epoxy groups of the bisphenol epoxy resin monomer and aliphatic diglycidyl ether to anhydride groups of the anhydride compound is between 3.5:1 and 8.8:1, wherein the bisphenol epoxy resin monomer and aliphatic diglycidyl ether have a molar ratio of 0.3:1 to 1.3:1, wherein the viscosity of the resin composition is 20 Pa·s to 80 Pa·s at 25, and wherein the cured resin composition has a first glass transition temperature that is lower than room temperature and a second glass transition temperature that is higher than room temperature.

In some embodiments, the resin composition includes the unreacted bisphenol epoxy resin monomer and aliphatic diglycidyl ether.

In some embodiments, the bisphenol epoxy resin monomer comprises bisphenol A epoxy resin monomer, hydrogenated bisphenol A epoxy resin monomer, bisphenol F epoxy resin monomer, hydrogenated bisphenol F epoxy resin monomer, or a combination thereof.

In some embodiments, the aliphatic diglycidyl ether includes ethylene glycol diglycidyl ether, dipropylene glycol diglycidyl ether, 1,4-butylene glycol diglycidyl ether, neopentylene glycol diglycidyl ether, 1,6-hexanediol diglycidyl ether, 1,4-cyclohexanedimethanol diglycidyl ether, polypropylene glycol diglycidyl ether, or a combination thereof.

In some embodiments, the anhydride compound includes 4-methylhexahydrophthalic anhydride, hexahydrophthalic anhydride, Nadic methyl anhydride, 1,2,4-trimellitic anhydride, dodecenyl succinic anhydride, phthalic anhydride, tetrahydrophthalic anhydride, methyl tetrahydrophthalic anhydride, or a combination thereof.

In some embodiments, the catalyst includes triethnolamine, dimethylbenzylamine, triphenylphosphine, or a combination thereof.

In some embodiments, the curing agent includes a cationic initiator or an anionic initiator.

In some embodiments, the resin composition further includes an acrylate oligomer and a radical initiator.

In some embodiments, the resin composition further includes a filler, a defoamer, a leveling agent, or a combination thereof.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a resin composition, which includes an oligomer formed by reacting bisphenol epoxy resin monomer, aliphatic diglycidyl ether, anhydride compound, and catalyst. The oligomer has a plurality of epoxy groups, which can undergo ring-opening reaction in a following curing step. In addition, the oligomer has a hard segment from the bisphenol epoxy resin monomer and a soft segment from the aliphatic diglycidyl ether. Therefore, the oligomer has not only flexibility but also excellent adhesion to flexible substrates (especially hetero substrates, such as PET vs. TAC, PET vs. PEN, PET vs. PI, PEN vs. PI, and PEN vs. TAC). In one embodiment, the molar ratio of epoxy groups of the bisphenol epoxy resin monomer and aliphatic diglycidyl ether to anhydride groups of the anhydride compound is between 3.5:1 and 8.8:1. If there is too much of the epoxy group, then there will be too much unreacted bisphenol epoxy resin monomer or aliphatic diglycidyl ether, and the esterification of the resin will be insufficient. If there is too little of the epoxy group, the viscosity of the reacted resin will be high and difficult to control, and the product will even gel. The bisphenol epoxy resin monomer and aliphatic diglycidyl ether have a molar ratio of 0.3:1 to 1.3:1. The bisphenol epoxy resin monomer that is too much results in an overly rigid resin, which has a poor adhesion to the flexible substrate. The bisphenol epoxy resin monomer that is too less results in an overly soft resin due to poor cohesion force between molecular chains, thereby lowering the adhesion to hetero substrates. The viscosity of the oligomer-containing resin composition is 20 Pa·s to 80 Pa·s at room temperature. The resin composition with a viscosity that is too low may result in a poor film formability of the resin composition onto the flexible substrate. The resin composition with a viscosity that is too high cannot be easily coated, applied, and used.

The oligomer is formed by reacting bisphenol epoxy resin monomer, aliphatic diglycidyl ether, anhydride compound, and catalyst at 100° C. to 130° C. for a period of 0.5 hours to 3 hours. The lower reaction temperature needs a longer reaction period, and vice versa. The reaction temperature that is too high and/or the reaction period that is too long easily causes gel phenomenon. The reaction temperature that is too low and/or the reaction period that is too short cannot ring-open the epoxy groups of the bisphenol epoxy resin monomer and the aliphatic diglycidyl ether to react with other epoxy groups and anhydride compound for forming prepolymer.

In some embodiments, the resin composition includes the unreacted bisphenol epoxy resin monomer and aliphatic diglycidyl ether, and epoxy groups thereof can be ring-opened to crosslink the oligomer in the following curing step. In addition, the more unreacted bisphenol epoxy resin monomer and aliphatic diglycidyl ether means the lower viscosity of the resin composition, and vice versa.

In some embodiments, the bisphenol epoxy resin monomer includes bisphenol A epoxy resin monomer, hydrogenated bisphenol A epoxy resin monomer, bisphenol F epoxy resin monomer, hydrogenated bisphenol F epoxy resin monomer, or a combination thereof.

In some embodiments, the aliphatic diglycidyl ether includes ethylene glycol diglycidyl ether, dipropylene glycol diglycidyl ether, 1,4-butylene glycol diglycidyl ether, neopentylene glycol diglycidyl ether, 1,6-hexanediol diglycidyl ether, 1,4-cyclohexanedimethanol diglycidyl ether, polypropylene glycol diglycidyl ether, or a combination thereof.

In some embodiments, the anhydride compound includes 4-methylhexahydrophthalic anhydride, hexahydrophthalic anhydride, Nadic methyl anhydride, 1,2,4-trimellitic anhydride, dodecenyl succinic anhydride, phthalic anhydride, tetrahydrophthalic anhydride, methyl tetrahydrophthalic anhydride, or a combination thereof.

In some embodiments, the catalyst includes triethnolamine, dimethylbenzylamine, triphenylphosphine, or a combination thereof.

In some embodiments, the resin composition further includes curing agent such as cationic initiator or anionic initiator. The curing agent is beneficial for ring-opening epoxy group to crosslink and cure the oligomer. The cationic initiator can be further classified to UV type cationic initiator and thermal type cationic initiator, which depends on the type the applied energy. For example, the UV type cationic initiator can be diaromatic iodide or triaromatic sulfide. The thermal type cationic initiator can be aromatic sulfonium compound such as [4-[(methoxycarbonyl)oxy]phenyl]methyl(phenylmethyl) sulfonium:(OC-6-11)-hexafluoroantimonate(1-), (4-hydroxyphenyl)methyl(1-naphthalenylmethyl) sulfonium:(OC-6-11)-hexafluoroantimonate(1-), (4-hydroxyphenyl)methyl [(2-methylphenyl)methyl]sulfonium:(OC-6-11)-hexafluoroantimonate(1-), (4-hydroxyphenyl)methyl(phenylmethyl)sulfonium:(OC-6-11)-hexafluoro antimonate(1-), [4-(acetyloxy)phenyl]dimethylsulfonium:(OC-6-11)-hexafluoro antimonate(1-), (4-hydroxyphenyl)methyl(phenylmethyl)sulfonium:hexafluoro phosphate(1-), or a combination thereof. In one embodiment, the anionic initiator can be thermal type anionic initiator such as (4-hydroxyphenyl)methyl(phenylmethyl) sulfonium:tetrakis(2,3,4,5,6-oentafluorophenyl)borate(1-) (1:1), (4-hydroxyphenyl) dimethylsulfonium:tetrakis(2,3,4,5,6-oentafluorophenyl)borate(1-) (1:1), [4-(acetyloxy)phenyl]dimethylsulfonium:tetrakis(2,3,4,5,6-oentafluorophenyl)borate(1-) (1:1), or a combination thereof.

In some embodiments, the resin composition further includes acrylate oligomer and radical initiator. For example, the acrylate oligomer can be polyester acrylate, such as DM623 commercially available from Double Bond Chemical Ind., Co., Ltd. The radical initiator can be UV type radical initiator, which includes benzoin (e.g. benzoin methyl ether, benzoin ethyl ether, or benzoin n-butyl ether); acetophenone (e.g. dialkoxy acetophenone, chloroacetophenone, or 2-hydroxy-2-methyl-1-propanone), or a combination thereof. The acrylate oligomer can be used to adjust the viscosity of the resin composition. The radical initiator can be used to cure the acrylate oligomer in the resin composition during the step of curing the resin composition.

In some embodiments, the resin composition further includes filler, defoamer, leveling agent, or a combination thereof to adjust the properties or appearance of the resin composition after being cured. For example, the filler may enhance the mechanical strength of the resin composition after being cured, and the filler may includes silica, talc, alumina, clay, the like, or a combination thereof. The leveling agent makes the coating of the resin composition have a uniform thickness, and the leveling agent may include Doxflow 6057 or DOXflow 6345 commercially available from DOXA Chemical, SPL-90 or SPL-460 commercially available from Kelly Chemical Co., or a combination thereof. The defoamer has an excellent defoaming effect, and the defoamer may include KF-06 and KS-7708 commercially available from TOPCO SCIENTIFIC Co., Ltd., 68 or F22 commercially available from DOXA Chemical, or a combination thereof.

One embodiment of the disclosure provides a cured resin composition, wherein the resin composition includes a curing agent and an oligomer formed by reacting bisphenol epoxy resin monomer, aliphatic diglycidyl ether, anhydride compound, and catalyst. The resin compositions is cured at 80° C. to 120° C. for a period of 30 to 60 minutes. The lower curing temperature needs a longer curing period, and vice versa. The curing temperature that is too high and/or the curing period that is too long easily deforms or yellows the flexible substrates. The curing temperature that is too low and/or the curing period that is too short cannot induce curing or can lead to incomplete cure of the resin composition.

In some embodiments, the molar ratio of epoxy groups of the bisphenol epoxy resin monomer and aliphatic diglycidyl ether to anhydride groups of the anhydride compound is between 3.5:1 and 8.8:1. The bisphenol epoxy resin monomer and aliphatic diglycidyl ether have a molar ratio of 0.3:1 to 1.3:1. The viscosity of the resin composition is 20 Pa·s to 80 Pa·sat 25° C.

In one embodiment, the cured resin composition has first glass transition temperature (Tg) lower than room temperature and second Tg higher than room temperature. The resin segment with the second Tg higher than room temperature has a rigid property, and the resin segment with the first Tg lower than room temperature has a flexible property. The flexible and rigid properties of different segments may increase the affinity to surfaces of different flexible substrates. The interaction may enhance the adhesion to hetero substrates. Note that general epoxy resin compositions after being cured only have single Tg and therefore lack the above effect.

In some embodiments, the resin composition includes the unreacted bisphenol epoxy resin monomer and aliphatic diglycidyl ether. In some embodiments, the curing agent includes cationic initiator or anionic initiator. In some embodiments, the resin composition further includes acrylate oligomer and radical initiator. In some embodiments, the resin composition further includes filler, defoamer, leveling agent, or a combination thereof. The detail of the composition is similar to that described above, and not repeated here.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Synthesis Example 1-1 (Resin Composition CH-BA-H1)

48 parts by weight of 1,4-bis(glycidyloxymethyl)cyclohexane (CHGE, commercially available from CVC Thermoset Specialties, 0.310 equivalent mole), 32 parts by weight of bisphenol A epoxy resin monomer (BE-18L, commercially available from CHANG CHUN PLASTICS CO., LTD., 0.171 equivalent mole), and 20 parts by weight of 4-methylhexahydrophthalic anhydride (0.119 equivalent mole) were mixed. The epoxy groups of CHGE and BE-188L and the anhydride groups of 4-methylhexahydrophthalic anhydride had a molar ratio of 4.04:1. 0.08 parts by weight of triethnolamine serving as catalyst was added to the mixture, and the mixture was then reacted in an oil bath at 120° C. for 60 minutes to form resin composition CH-BA-H1. The viscosity of resin composition CH-BA-H1 at room temperature was about 54 Pa·s, which was measured by viscometer BROOKFIELD DV-III ULTRA.

Synthesis Example 1-2 (Resin Composition CH-BF-H1)

48 parts by weight of 1,4-bis(glycidyloxymethyl)cyclohexane (CHGE, 0.310 equivalent mole), 32 parts by weight of bisphenol F epoxy resin monomer (830S, commercially available from DIC, 0.187 equivalent mole), and 20 parts by weight of 4-methylhexahydrophthalic anhydride (0.119 equivalent mole) were mixed. The epoxy groups of CHGE and 830S and the anhydride groups of 4-methylhexahydrophthalic anhydride had a molar ratio of 4.09:1. 0.08 parts by weight of triethnolamine serving as catalyst was added to the mixture, and the mixture was then reacted in an oil bath at 120° C. for 60 minutes to form resin composition CH-BF-H1. The viscosity of resin composition CH-BF-H1 at room temperature was about 51 Pa·s, which was measured by viscometer BROOKFIELD DV-III ULTRA.

Synthesis Example 1-3 (Resin Composition BD-BF-H1)

50 parts by weight of 1,4-butanediol diglycidyl ether (BDGE, commercially available from CVC Thermoset Specialties, 0.4 equivalent mole), 38 parts by weight of bisphenol F epoxy resin monomer (830S, 0.222 equivalent mole), and 12 parts by weight of 4-methylhexahydrophthalic anhydride (0.071 equivalent mole) were mixed. The epoxy groups of BDGE and 830S and the anhydride groups of 4-methylhexahydrophthalic anhydride had a molar ratio of 8.76:1. 0.088 parts by weight of triethnolamine serving as catalyst was added to the mixture, and the mixture was then reacted in an oil bath at 120° C. for 60 minutes to form resin composition BD-BF-H1. The viscosity of resin composition BD-BF-H1 at room temperature was about 39 Pa·s, which was measured by viscometer BROOKFIELD DV-III ULTRA.

Synthesis Example 1-4 (Resin Composition BD-BA-H2)

30 parts by weight of 1,4-butanediol diglycidyl ether (BDGE, 0.24 equivalent mole), 52 parts by weight of bisphenol A epoxy resin monomer (BE-188L, 0.278 equivalent mole), and 18 parts by weight of hexahydrophthalic anhydride (0.117 equivalent mole) were mixed. The epoxy groups of BDGE and BE-188L and the anhydride groups of hexahydrophthalic anhydride had a molar ratio of 4.43:1. 0.082 parts by weight of triethnolamine serving as catalyst was added to the mixture, and the mixture was then reacted in an oil bath at 120° C. for 60 minutes to form resin composition BD-BA-H2. The viscosity of resin composition BD-BA-H2 at room temperature was about 57 Pa·s, which was measured by viscometer BROOKFIELD DV-III ULTRA.

Synthesis Example 1-5 (Resin Composition BD-HY-H2)

32 parts by weight of 1,4-butanediol diglycidyl ether (BDGE, 0.256 equivalent mole), 48 parts by weight of hydrogenated bisphenol A epoxy resin monomer (EPALLOY™ 5000, commercially available from CVC Thermoset Specialties, 0.218 equivalent mole), and 20 parts by weight of hexahydrophthalic anhydride (0.130 equivalent mole) were mixed. The epoxy groups of BDGE and EPALLOY™ 5000 and the anhydride groups of hexahydrophthalic anhydride had a molar ratio of 3.63:1. 0.08 parts by weight of triethnolamine serving as catalyst was added to the mixture, and the mixture was then reacted in an oil bath at 120° C. for 60 minutes to form resin composition BD-HY-H2. The viscosity of resin composition BD-HY-H2 at room temperature was about 34 Pa·s, which was measured by viscometer BROOKFIELD DV-III ULTRA.

Synthesis Example 1-6 (Resin Composition HD-BA-H1)

32 parts by weight of 1,6-hexanediol diglycidyl ether (HDGE, commercially available from CVC Thermoset Specialties, 0.214 equivalent mole), 50 parts by weight of bisphenol A epoxy resin monomer (BE-188L, 0.267 equivalent mole), and 18 parts by weight of 4-methylhexahydrophthalic anhydride (0.107 equivalent mole) were mixed. The epoxy groups of HDGE and BE-188L and the anhydride groups of 4-methylhexahydrophthalic anhydride had a molar ratio of 4.50:1. 0.082 parts by weight of triethnolamine serving as catalyst was added to the mixture, and the mixture was then reacted in an oil bath at 120° C. for 60 minutes to form resin composition HD-BA-H1. The viscosity of resin composition HD-BA-H1 at room temperature was about 55 Pa·s, which was measured by viscometer BROOKFIELD DV-III ULTRA.

Synthesis Example 1-7 (Resin Composition HD-BF-H2)

32 parts by weight of 1,6-hexanediol diglycidyl ether (HDGE, 0.256 equivalent mole), 48 parts by weight of bisphenol F epoxy resin monomer (830S, 0.281 equivalent mole), and 20 parts by weight of hexahydrophthalic anhydride (0.122 equivalent mole) were mixed. The epoxy groups of HDGE and 830S and the anhydride groups of hexahydrophthalic anhydride had a molar ratio of 4.40:1. 0.08 parts by weight of triethnolamine serving as catalyst was added to the mixture, and the mixture was then reacted in an oil bath at 120° C. for 60 minutes to form resin composition HD-BF-H2. The viscosity of resin composition HD-BF-H2 at room temperature was about 58 Pa·s, which was measured by viscometer BROOKFIELD DV-III ULTRA.

Synthesis Example 1-8 (Resin Composition ND-HY-H1)

50 parts by weight of neopentyl glycol diglycidyl ether (NDGE, commercially available from CVC Thermoset Specialties, 0.382 equivalent mole), 32 parts by weight of hydrogenated bisphenol A epoxy resin monomer (EPALLOY™ 5000, 0.145 equivalent mole), and 18 parts by weight of 4-methylhexahydrophthalic anhydride (0.107 equivalent mole) were mixed. The epoxy groups of NDGE and EPALLOY™ 5000 and the anhydride groups of 4-methylhexahydrophthalic anhydride had a molar ratio of 4.93:1. 0.082 parts by weight of triethnolamine serving as catalyst was added to the mixture, and the mixture was then reacted in an oil bath at 120° C. for 60 minutes to form resin composition ND-HY-H1. The viscosity of resin composition ND-HY-H1 at room temperature was about 25 Pa·s, which was measured by viscometer BROOKFIELD DV-III ULTRA.

Synthesis Example 1-9 (Resin Composition ND-BA-H2)

32 parts by weight of neopentyl glycol diglycidyl ether (NDGE, 0.244 equivalent mole), 32 parts by weight of bisphenol A epoxy resin monomer (BE-188L, 0.171 equivalent mole), and 20 parts by weight of hexahydrophthalic anhydride (0.12 equivalent mole) were mixed. The epoxy groups of NDGE and BE-188L and the anhydride groups of hexahydrophthalic anhydride had a molar ratio of 3.46:1. 0.064 parts by weight of triethnolamine serving as catalyst was added to the mixture, and the mixture was then reacted in an oil bath at 120° C. for 60 minutes to form resin composition ND-BA-H2. The viscosity of resin composition ND-BA-H2 at room temperature was about 72 Pa·s, which was measured by viscometer BROOKFIELD DV-III ULTRA.

Example 1

100 g of resin composition CH-BA-H1, 1 g of fumed silica R974 serving as filler, 6 g of UV type cationic initiator Chivacure 1176 (dissolved in propylene carbonate, 50%, commercially available from Chitec Technology Co., Ltd) serving as curing agent were mixed at room temperature, and further mixed and defoamed by THINKY mixer. The resin composition was coated on a polyethylene terephthalate (PET) flexible substrate (O type, commercially available from ShinKong Materials Technology Co., Ltd., 188 μm) to form a film with a thickness of about 25 μm by a 25 μm wire rod. The PET flexible substrate was then attached to another flexible substrate (e.g. triacetyl cellulose film (TAC, prepared by ITRI, Material and Chemical Research Laboratories, L600), polyethylene naphthalate film (PEN, commercially available from Teijin Chemicals Ltd., 100 μm), or polyimide film (PI, prepared by ITRI, Material and Chemical Research Laboratories, L700)) at room temperature by a laminator to complete samples (PET vs. TAC, PET vs. PEN, and PET vs. PI). The laminated samples were exposed by UV with a wavelength of 365 nm and energy of 5000 mJ/cm$^2$ from a mercury lamp, and then baked at 80° C. in an oven for 30 minutes to perform a curing reaction. All the samples were cut into strips with a width of 2.5 cm and a length of 8 cm. The peel strength of the sample strips were then tested by a dual column tensile strength testing machine (QC Tech) with an elongation rate of 254 mm/min (according to the standard ASTM 1876-01T-Peel Test). The glass transition temperature (Tg) of the cured resin composition was measured by the following steps: 5 mg of the cured sample was cut and put onto a dedicated aluminum plate of the instrument, and heated to 250° C. by a rate of 20° C./min under nitrogen to measure its Tg by a differential scanning calorimeter (Q10, TA Instruments).

Example 2

100 g of resin composition CH-BF-H1, 1 g of fumed silica R974 serving as filler, 2 g of thermal type cationic initiator SI-60 (commercially available from Sanshin Chemical Industry Co., Ltd.) serving as curing agent were mixed at room temperature, and further mixed and defoamed by THINKY mixer. The resin composition was coated on a flexible substrate (e.g. PET film or a PEN film) to form a film with a thickness of about 25 μm by a 25 μm wire rod. The flexible substrate (PET film or PEN film) was then attached to another flexible substrate (e.g. TAC film, PEN film, or PI film) at room temperature by a laminator to complete samples (PET vs. TAC, PET vs. PEN, PET vs. PI, PEN vs. PI, and PEN vs. TAC). The laminated samples were baked at 80° C. in an oven for 60 minutes to perform a curing reaction. All the samples were cut into strips with a width of 2.5 cm and a length of 8 cm. The peel strength of the sample strips were then tested by a dual column tensile strength testing machine (QC Tech) with an elongation rate of 254 mm/min (according to the standard ASTM 1876-01T-Peel Test). The Tg of the cured resin composition was measured by the following steps: 5 mg of the cured sample was cut and put onto a dedicated aluminum plate of the instrument, and heated to 250° C. by a rate of 20° C./min under nitrogen to measure its Tg by a differential scanning calorimeter (Q10, TA Instruments).

Example 3

Example 3 was similar to Example 1, and the difference in Example 3 was the resin composition being changed to 100 g of resin monomer BD-BF-H1, 1 g of fumed silica R974, and 6 g of UV type cationic initiator Chivacure 1176. Methods of attaching the flexible substrates, curing, testing peeling strength, and measuring Tg were similar to those in Example 1.

Example 4

Example 4 was similar to Example 1, and the difference in Example 4 was the resin composition being changed to 100 g of resin composition BD-BA-H2, 1 g of fumed silica R974, and 6 g of UV type cationic initiator Chivacure 1176. Methods of attaching the flexible substrates, curing, testing peeling strength, and measuring Tg were similar to those in Example 1.

Example 5

Example 5 was similar to Example 1, and the difference in Example 5 was the resin composition being changed to 90 g of resin composition BD-HY-H2, 1 g of fumed silica R974, 5.4 g of UV type cationic initiator Chivacure 1176, 10 g of polyester acrylate DM623 (commercially available from Double Bond Chemical Ind., Co., Ltd.), and 0.4 g of radical initiator TPO (2,4,6-Trimethylbenzoyl-diphenyl-phosphineoxide, commercially available from Mufong company). Methods of attaching the flexible substrates, curing, testing peeling strength, and measuring Tg were similar to those in Example 1.

Example 6

Example 6 was similar to Example 2, and the difference in Example 6 was the resin composition being changed to 100 g of resin composition HD-BA-H1, 1 g of fumed silica R974, and 2 g of thermal type cationic initiator SI-60. Methods of attaching the flexible substrates, curing, testing peeling strength, and measuring Tg were similar to those in Example 2.

Example 7

Example 7 was similar to Example 1, and the difference in Example 7 was the resin composition being changed to 100 g of resin composition HD-BF-H2, 1 g of fumed silica R974, and 6 g of UV type cationic initiator Chivacure 1176. Methods of attaching the flexible substrates, curing, testing peeling strength, and measuring Tg were similar to those in Example 1.

Example 8

Example 8 was similar to Example 1, and the difference in Example 8 was the resin composition being changed to 100 g of resin composition ND-HY-H1, 1 g of fumed silica R974, and 6 g of UV type cationic initiator Chivacure 1176. Methods of attaching the flexible substrates, curing, testing peeling strength, and measuring Tg were similar to those in Example 1.

Example 9

Example 9 was similar to Example 1, and the difference in Example 9 was the resin composition being changed to 80 g of resin composition ND-BA-H2, 1 g of fumed silica R974, 4.8 g of UV type cationic initiator Chivacure 1176, 20 g of polyester acrylate DM623, and 0.8 g of radical initiator TPO. Methods of attaching the flexible substrates, curing, testing peeling strength, and measuring Tg were similar to those in Example 1.

Example 10

Example 10 was similar to Example 1, and the difference in Example 10 was the resin composition being changed to 50 g of resin composition CH-BA-H1, 50 g of resin composition HD-BF-H2, 1 g of fumed silica R974, and 6 g of UV type cationic initiator Chivacure 1176. Methods of attaching the flexible substrates, curing, testing peeling strength, and measuring Tg were similar to those in Example 1.

Comparative Example 1

Comparative Example 1 was similar to Example 1, and the difference in Comparative Example 1 was the resin composition being changed to 100 g of bisphenol A epoxy resin monomer BE-188 L, 1 g of fumed silica R974, and 6 g of UV type cationic initiator Chivacure 1176. Methods of attaching the flexible substrates, curing, testing peeling strength, and measuring Tg were similar to those in Example 1.

Comparative Example 2

Comparative Example 2 was similar to Example 1, and the difference in Comparative Example 2 was the resin composition being changed to 100 g of bisphenol F epoxy resin monomer 830S, 1 g of fumed silica R974, and 6 g of UV type cationic initiator Chivacure 1176. Methods of attaching the flexible substrates, curing, testing peeling strength, and measuring Tg were similar to those in Example 1.

Comparative Example 3

Comparative Example 3 was similar to Example 1, and the difference in Comparative Example 3 was the resin composition being changed to 50 g of 1,4-butanediol diglycidyl ether (BDGE), 10 g of bisphenol A epoxy resin monomer (BE-188L), 40 g of bisphenol F epoxy resin monomer 830S, 1 g of fumed silica R974, and 6 g of UV type cationic initiator Chivacure 1176. Methods of attaching the flexible substrates, curing, testing peeling strength, and measuring Tg were similar to those in Example 1.

Comparative Example 4

Comparative Example 4 was similar to Example 2, and the difference in Comparative Example 4 was the resin composition being changed to 50 g of 1,6-hexanediol diglycidyl ether (HDGE), 50 g of bisphenol A epoxy resin monomer (BE-188L), 1 g of fumed silica R974, and 2 g of thermal type cationic initiator SI-60. Methods of attaching the flexible substrates, curing, testing peeling strength, and measuring Tg were similar to those in Example 2.

TABLE 1

|  | Example 1 | Example 2 | Example 3 | Example 4 | Example 5 |
|---|---|---|---|---|---|
| Major resin composition | CH-BA-H1 (100) | CH-BF-H1 (100) | BD-BF-H1 (100) | BD-BA-H2 (100) | BD-HY-H2 (90) + DM623 (10) |
| Fumed silica | 1 | 1 | 1 | 1 | 1 |
| UV type cationic initiator | 6 |  | 6 | 6 | 5.4 |
| Radical initiator |  |  |  |  | 0.4 |
| Thermal type radical initiator |  | 2 |  |  |  |
| First Tg | 13° C. | 11° C. | 12° C. | 14° C. | 9° C. |
| Second Tg | 89° C. | 81° C. | 84° C. | 90° C. | 71° C. |
| Peel strength of PET vs. TAC (kgf) | 2.4 | 3.1 | 2.2 | 3.6 | 2.5 |
| Peel strength of PET vs. PEN (kgf) | 3.5 | 3.4 | 3.1 | 3.8 | 3.2 |
| Peel strength of PET vs. PI (kgf) | 3.1 | 2.7 | 2.4 | 2.8 | 2.4 |
| Peel strength of PEN vs. PI (kgf) |  | 1.3 |  |  |  |
| Peel strength of PET vs. TAC (kgf) |  | 2.2 |  |  |  |

TABLE 2

|  | Example 6 | Example 7 | Example 8 | Example 9 | Example 10 |
|---|---|---|---|---|---|
| Major resin composition | HD-BA-H1 (100) | HD-BF-H2 (100) | ND-HY-H1 (100) | BD-BA-H2 (80) + DM623 (20) | CH-BA-H1 (50) + HD-BF-H2 (50) |
| Fumed silica | 1 | 1 | 1 | 1 | 1 |
| UV type cationic initiator |  | 6 | 6 | 4.8 | 6 |
| Radical initiator |  |  |  | 0.8 |  |
| Thermal type radical initiator | 2 |  |  |  |  |
| First Tg | 18° C. | 16° C. | 16° C. | 12° C. | 15° C. |
| Second Tg | 91° C. | 88° C. | 85° C. | 90° C. | 88° C. |
| Peel strength of PET vs. TAC (kgf) | 2.7 | 3.2 | 2.9 | 2.1 | 3.0 |
| Peel strength of PET vs. PEN (kgf) | 3.3 | 3.2 | 3.5 | 3.9 | 3.6 |
| Peel strength of PET vs. PI (kgf) | 2.5 | 2.2 | 2.4 | 2.8 | 2.6 |
| Peel strength of PEN vs. PI (kgf) | 1.3 |  |  | 1.1 |  |
| Peel strength of PET vs. TAC (kgf) | 2.6 |  |  | 2.0 |  |

TABLE 3

|  | Comparative Example 1 | Comparative Example 2 | Comparative Example 3 | Comparative Example 4 |
|---|---|---|---|---|
| Major resin composition | BE-188L (100) | 830S (100) | BDGE (50) + BE-188L (10) + 830S (40) | HDGE (50) + BE-188L (50) |
| Fumed silica | 1 | 1 | 1 | 1 |
| UV type cationic initiator |  | 6 | 6 |  |
| Thermal type radical initiator | 2 |  |  | 2 |
| First Tg | None | None | None | None |
| Second Tg | 50° C. | 53° C. | 44° C. | 42° C. |
| Peel strength of PET vs. TAC (kgf) | 0.05 | 0.09 | 0.6 | 0.9 |
| Peel strength of PET vs. PEN (kgf) | 0.5 | 0.9 | 0.8 | 0.6 |
| Peel strength of PET vs. PI (kgf) | 0.4 | 0.8 | 0.6 | 0.4 |
| Peel strength of PEN vs. PI (kgf) |  |  |  | 0.1 |
| Peel strength of PET vs. TAC (kgf) |  |  |  | 0.5 |

As shown in Examples and Comparative Examples of Tables 1 to 3, the epoxy resin compositions in Examples after being cured could obviously enhance the adhesion to flexible substrates, especially hetero flexible substrates. Compared to Comparative Examples, the peeling strength of PET vs. TAC was enhanced 6 to 7 times in Examples, the peeling strength of PET vs. PI was enhanced 5 to 6 times in Examples, the peeling strength of PEN vs. PI was enhanced 11 to 12 times in Examples, and the peeling strength of PEN vs. TAC was enhanced 4 to 5 times in Examples. In addition, the cured resin compositions in Examples had first Tg lower than room temperature and second Tg higher than room temperature.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A resin composition, comprising:
    an oligomer formed by reacting bisphenol epoxy resin monomer, aliphatic diglycidyl ether, anhydride compound, and catalyst,
    wherein the molar ratio of epoxy groups of the bisphenol epoxy resin monomer and aliphatic diglycidyl ether to anhydride groups of the anhydride compound is between 3.5:1 and 8.8:1,
    wherein the bisphenol epoxy resin monomer and aliphatic diglycidyl ether have a molar ratio of 0.3:1 to 1.3:1, and
    wherein the viscosity of the resin composition is 20 Pa·s to 80 Pa·s at 25° C.

2. The resin composition as claimed in claim 1, comprising the unreacted bisphenol epoxy resin monomer and aliphatic diglycidyl ether.

3. The resin composition as claimed in claim 1, wherein the bisphenol epoxy resin monomer comprises bisphenol A epoxy resin monomer, hydrogenated bisphenol A epoxy resin monomer, bisphenol F epoxy resin monomer, hydrogenated bisphenol F epoxy resin monomer, or a combination thereof.

4. The resin composition as claimed in claim 1, wherein the aliphatic diglycidyl ether comprises ethylene glycol diglycidyl ether, dipropylene glycol diglycidyl ether, 1,4-butylene glycol diglycidyl ether, neopentylene glycol diglycidyl ether, 1,6-hexanediol diglycidyl ether, 1,4-cyclohexanedimethanol diglycidyl ether, polypropylene glycol diglycidyl ether, or a combination thereof.

5. The resin composition as claimed in claim 1, wherein the anhydride compound comprises 4-methylhexahydrophthalic anhydride, hexahydrophthalic anhydride, Nadic methyl anhydride, 1,2,4-trimellitic anhydride, dodecenyl succinic anhydride, phthalic anhydride, tetrahydrophthalic anhydride, methyl tetrahydrophthalic anhydride, or a combination thereof.

6. The resin composition as claimed in claim 1, wherein the catalyst comprises triethanolamine, dimethylbenzylamine, triphenylphosphine, or a combination thereof.

7. The resin composition as claimed in claim 1, further comprising a curing agent.

8. The resin composition as claimed in claim 7, wherein the curing agent comprises a cationic initiator or an anionic initiator.

9. The resin composition as claimed in claim 7, further comprising an acrylate oligomer and a radical initiator.

10. The resin composition as claimed in claim 7, further comprising a filler, a defoamer, a leveling agent, or a combination thereof.

11. A cured resin composition, wherein the resin composition comprises:
    an oligomer formed by reacting bisphenol epoxy resin monomer, aliphatic diglycidyl ether, anhydride compound, and catalyst, and
    a curing agent;
    wherein the molar ratio of epoxy groups of the bisphenol epoxy resin monomer and aliphatic diglycidyl ether to anhydride groups of the anhydride compound is between 3.5:1 and 8.8:1, wherein the bisphenol epoxy resin monomer and aliphatic diglycidyl ether have a molar ratio of 0.3:1 to 1.3:1, wherein the viscosity of the resin composition is 20 Pa·s to 80 Pa·s at 25° C., and wherein the cured resin composition has a first glass transition temperature that is lower than room temperature and a second glass transition temperature that is higher than room temperature.

12. The cured resin composition as claimed in claim 11, wherein the resin composition comprises the unreacted bisphenol epoxy resin monomer and aliphatic diglycidyl ether.

13. The cured resin composition as claimed in claim 11, wherein the bisphenol epoxy resin monomer comprises bisphenol A epoxy resin monomer, hydrogenated bisphenol A epoxy resin monomer, bisphenol F epoxy resin monomer, hydrogenated bisphenol F epoxy resin monomer, or a combination thereof.

14. The cured resin composition as claimed in claim 11, wherein the aliphatic diglycidyl ether comprises ethylene glycol diglycidyl ether, dipropylene glycol diglycidyl ether, 1,4-butylene glycol diglycidyl ether, neopentylene glycol diglycidyl ether, 1,6-hexanediol diglycidyl ether, 1,4-cyclohexanedimethanol diglycidyl ether, polypropylene glycol diglycidyl ether, or a combination thereof.

15. The cured resin composition as claimed in claim 11, wherein the anhydride compound comprises 4-methylhexahydrophthalic anhydride, hexahydrophthalic anhydride, Nadic methyl anhydride, 1,2,4-trimellitic anhydride, dodecenyl succinic anhydride, phthalic anhydride, tetrahydrophthalic anhydride, methyl tetrahydrophthalic anhydride, or a combination thereof.

16. The cured resin composition as claimed in claim 11, wherein the catalyst comprises triethanolamine, dimethylbenzylamine, triphenylphosphine, or a combination thereof.

17. The cured resin composition as claimed in claim 11, wherein the curing agent comprises a cationic initiator or an anionic initiator.

18. The cured resin composition as claimed in claim 11, wherein the resin composition further comprises an acrylate oligomer and a radical initiator.

19. The cured resin composition as claimed in claim 11, wherein the resin composition further comprises a filler, a defoamer, a leveling agent, or a combination thereof.

* * * * *